(12) United States Patent
Sridharan et al.

(10) Patent No.: US 12,393,672 B1
(45) Date of Patent: Aug. 19, 2025

(54) DEVICE-BASED BOT DETECTION FOR SIGN-IN THREAT DETECTION

(71) Applicant: Amazon Technologies, Inc., Seattle, WA (US)

(72) Inventors: Venkatesh Sridharan, Mississauga (CA); Kuan Yu, Markham (CA); Chen Yao, North York (CA); Leo Brennan, Bury Saint Edmunds (GB)

(73) Assignee: Amazon Technologies, Inc., Seattle, WA (US)

( * ) Notice: Subject to any disclaimer, the term of this patent is extended or adjusted under 35 U.S.C. 154(b) by 178 days.

(21) Appl. No.: 18/082,740

(22) Filed: Dec. 16, 2022

(51) Int. Cl.
  *G06F 21/45* (2013.01)
  *G06F 21/32* (2013.01)

(52) U.S. Cl.
  CPC .............. *G06F 21/45* (2013.01); *G06F 21/32* (2013.01)

(58) Field of Classification Search
  CPC .................................. G06F 21/45; G06F 21/32
  See application file for complete search history.

(56) References Cited

U.S. PATENT DOCUMENTS

| | | | | |
|---|---|---|---|---|
| 10,587,629 | B1* | 3/2020 | Kurupati | G06F 21/50 |
| 10,830,863 | B1* | 11/2020 | Shemesh | G06F 21/44 |
| 2018/0103047 | A1* | 4/2018 | Turgeman | G06F 21/552 |
| 2019/0155624 | A1* | 5/2019 | Lu | G06F 3/04883 |
| 2019/0155625 | A1* | 5/2019 | Lu | G06F 3/0485 |
| 2019/0190950 | A1* | 6/2019 | Senecal | H04L 63/1483 |
| 2020/0137110 | A1* | 4/2020 | Tyler | H04L 63/1483 |
| 2020/0336496 | A1* | 10/2020 | Modalavalasa | G06F 21/552 |
| 2020/0396233 | A1* | 12/2020 | Luo | G06F 21/552 |
| 2021/0037048 | A1* | 2/2021 | Kurupati | H04L 63/1466 |
| 2021/0226987 | A1* | 7/2021 | Summers | H04L 63/102 |
| 2022/0166791 | A1* | 5/2022 | Senecal | H04L 63/1425 |
| 2022/0193555 | A1* | 6/2022 | Niknafs | A63F 13/79 |
| 2022/0329610 | A1* | 10/2022 | Senecal | H04L 63/1416 |
| 2023/0188565 | A1* | 6/2023 | Lin | H04L 63/168 726/22 |
| 2024/0121269 | A1* | 4/2024 | Elbaz | H04L 63/0435 |

FOREIGN PATENT DOCUMENTS

WO    WO-2021022243 A1 *  2/2021  ............... G06N 3/08

* cited by examiner

*Primary Examiner* — Richard G Keehn
(74) *Attorney, Agent, or Firm* — BakerHostetler

(57) ABSTRACT

A method includes receiving information indicative of a sign-in request associated with an account registered on a service; determining whether the sign-in request comprises a fingerprint, wherein the fingerprint comprises one or more attributes associated with an interaction of a user during a sign-in on the account; dynamically generating a risk score based on a comparison of the one or more attributes of the fingerprint with one or more attributes of a set of attributes collected from a plurality of sign-in requests, wherein the risk score is based on a determination that the fingerprint correlates with attributes in a set of attributes identified as associated with behavior associated with a bot; and in response to the risk score being at or above a risk score threshold, issuing an indication of failure of the sign-in request.

20 Claims, 6 Drawing Sheets

DEVICE-BASED BOT DETECTION FOR SIGN-IN THREAT DETECTION

BACKGROUND

In many computer systems, a user must be authenticated before accessing the system. A malicious user may attempt to access the user's account by tricking the system into authenticating the malicious user. The malicious user may automate the process of attempting to access the user's accounts through the use of bots.

BRIEF SUMMARY

The present disclosure includes a method including receiving information indicative of a sign-in request associated with an account registered on a service; determining whether the sign-in request comprises a fingerprint, wherein the fingerprint comprises one or more attributes associated with an interaction of a user during a sign-in on the account; dynamically generating a risk score based on a comparison of the one or more attributes of the fingerprint with one or more attributes of a set of attributes collected from a plurality of sign-in requests, wherein the risk score is based on a determination that the fingerprint correlates with attributes in a set of attributes identified as associated with behavior associated with a bot; and in response to the risk score being at or above a risk score threshold, issuing an indication of failure of the sign-in request.

The present disclosure also includes a system including a controller. The controller is configured to perform operations including receiving information indicative of a sign-in request associated with an account; determining whether the sign-in request comprises a fingerprint, wherein the fingerprint comprises one or more attributes associated with an interaction of a user during sign-in; generating a risk score based on a comparison of the one or more attributes of the fingerprint with one or more attributes of a set of attributes collected from a plurality of sign-in requests, wherein the set of attributes comprises attributes identified as associated with malicious behavior; and in response to the risk score being at or above a risk score threshold, issuing an indication of failure of the sign-in request.

The present disclosure also includes a non-transitory computer-readable medium storing one or more instructions that, when executed by one or more processors, cause the one or more processors to perform operations including receiving information indicative of a sign-in request associated with an account; determining whether the sign-in request comprises a fingerprint, wherein the fingerprint comprises one or more attributes associated with an interaction of a user during sign-in; in response to determining that the sign-in request comprises a fingerprint, dynamically generating a risk score based on a comparison of the one or more attributes of the fingerprint with one or more attributes of a set of attributes collected from a plurality of sign-in requests, wherein the set of attributes comprises attributes identified as associated with malicious behavior; and in response to the risk score being at or above a risk score threshold, issuing an indication of failure of the sign-in request.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more other embodiments of the subject technology. In one or more embodiments of the subject technology, structures and components are shown in block diagram form in order to avoid obscuring the concepts of the subject technology.

In many computer systems, a user must be authenticated before accessing the system. Authentication may include providing pre-registered credentials such as a username and password, two-factor authentication, a physical key (e.g., thumb drive), etc. A malicious user may attempt to access the user's account by tricking the system into authenticating the malicious user. For example, the malicious user may obtain the user's credentials by brute force, social engineering, or credential stuffing, among other attack vectors. The malicious user may automate the process of attempting to access the user's accounts through the use of bots. For example, the malicious user may create a script that performs one or more attacks on one or more users at a speed faster than the malicious user can perform manually. The subject technology provides an approach for detecting and handling bots to reduce or thwart the efforts of malicious users.

For example, Account Takeover (ATO) is a form of identity theft where a fraudster illegally uses bots to get access to a victim's AWS accounts by repeated attempts to sign-in to various accounts. For example, is a particular IP address attempts to login to 50 different accounts within a few seconds and one of those attempts is successful, then that successful sign-in is an ATO and the attack is from a bot.

Figure 1:
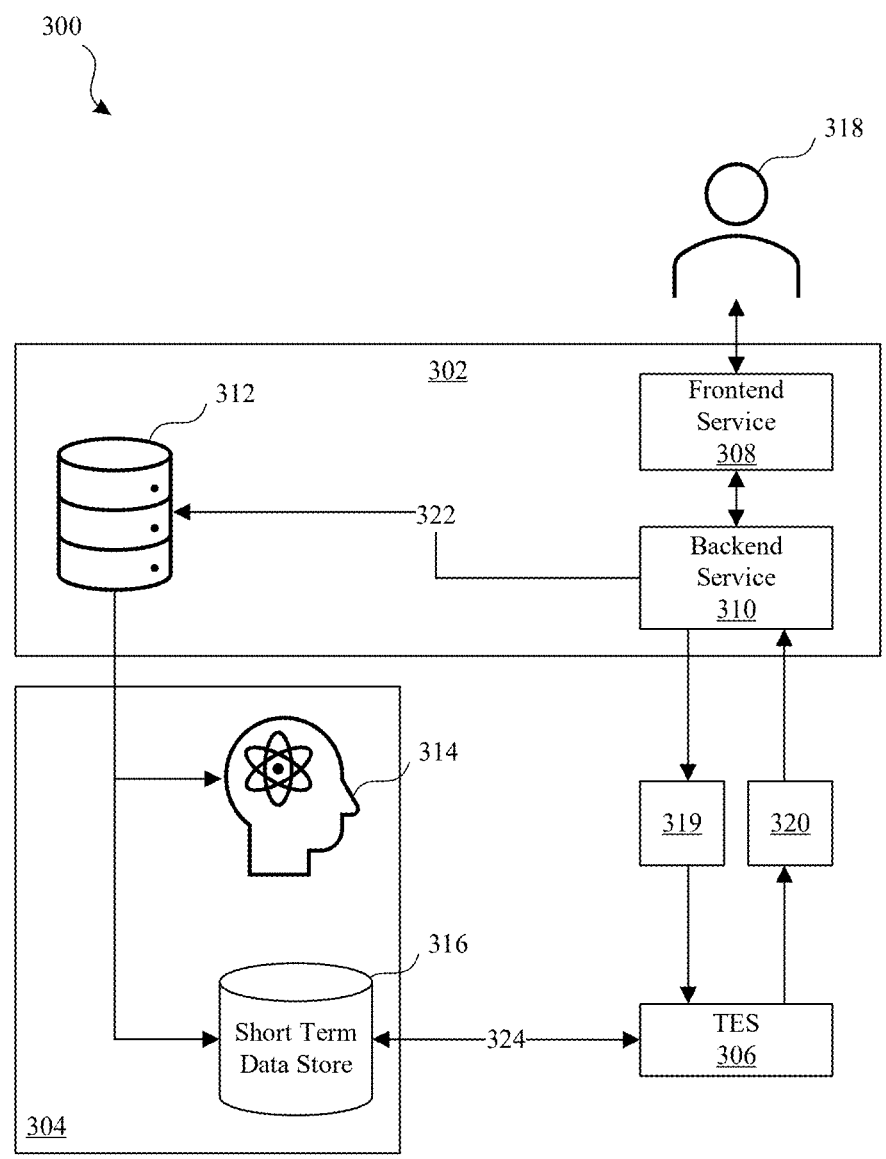
FIG. 1 illustrates a diagram of an example threat evaluation system, in accordance with one or more embodiments of the subject technology.

FIG. 1 illustrates a diagram of an example threat evaluation system 300, in accordance with one or more embodiments of the subject technology. Aspects of the system 300 may be discussed in further detail with respect to FIGS. 2-6. Not all depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

An authentication service 302 of the system 300 may receive a sign-in request from a user 318 (e.g., a legitimate or malicious user). To send the sign-in request, a sign-in web page may be sent to the user 318 via a frontend service 308. The user 318 may respond with a sign-in request via the sign-in web page. In an instance where a bot generates the sign-in request, the bot may bypass the frontend service 308 and send a sign-in request to the backend service 310 directly.

The sign-in request may be passed to the backend service 310. The backend service 310 may process and/or route the request to other services of the system (e.g., server 104). The sign-in request may include a fingerprint containing metadata about the sign-in, such as user credentials, IP address, user agent (e.g., web browser), timestamp, and other information relating to the sign-in request. The backend service 310 may generate a log entry 322 based on the information associated with the sign-in request and/or the fingerprint. The log entry 322 may be saved to a log database and may include a time-to-live value that determines how long the entry stays in the log database before it becomes outdated and is removed.

One or more log entries stored in the log database may be accessed by a bot detection service 304. The bot detection service 304 may include an analyst 314 and a short-term data store 316. The analyst 314 may be an individual and/or a software program (e.g., machine learning models, statistical models, heuristics, etc.). For example, the analyst 314 may be a software program having a deterministic set of rules created from offline heuristics to enable the bot detection service to understand the risk of a sign in attempt; the rules can be updated over time when the offline heuristics is re-ran. The log entries stored in the log database may be analyzed automatically and/or manually by the analyst 314 to identify threat patterns. The analyses may include determining potential threat vectors, locations of failed sign-in attempts, malicious IP addresses, and other patterns of malicious activities based on the log entries. Based on the analysis performed, the analyst 314 may determine one or more risk score thresholds associated with malicious activity. For example, more severe or common attacks may have a lower risk score threshold, which reduces the risk tolerance of the system 300 and makes the system 300 more generous in flagging the more severe or common attacks. The analyst 314 may also determine one or more challenges that may be issued in response to satisfying the one or more risk score thresholds to thwart suspicious (e.g., potentially malicious) activity. Challenges may include CAPTCHAs (e.g., automated tests to determine whether a user is a human), multi-factor authentication, temporary suspensions, and any other action that may make the sign-in process more difficult for a human and/or bot.

One or more of the log entries, or attributes thereof, stored in the log database may be marked as suspicious by the analyst 314 and may be transferred (e.g., moved, copied, etc.) to a short-term data store 316. The log entries that may be transferred to the short-term data store 316 may include a set of log entries over a period of time, over an IP range, corresponding to a particular threat vector, etc. The one or more risk score thresholds and/or the one or more challenges may also be transferred to the backend service 310. The log entries transferred to the short-term data store 316 may have or include a time-to-live value that determines how long the entry stays in the short-term data store 316 before it becomes outdated and is removed. In one or more embodiments, the time-to-live value of entries in the short-term data store 316 are shorter than those in the log database because entries in the short-term data store 316 are configured to be the source of more recent sign-in requests.

The backend service 310 may further perform an ad hoc analysis 319 as part of automatically determining whether the sign-in request is likely malicious. The ad hoc analysis 319 may receive as input the fingerprint of the sign-in request. The ad hoc analysis 319 may attempt to decrypt the fingerprint and output the decrypted fingerprint to the TES 306.

If the decryption is successful, the TES 306 may receive and perform one or more analyses on the decrypted fingerprint. For example, the TES 306 may query 324 a short-term data store 316, which includes entries indicating suspicious attributes of previous fingerprints and/or sign-in requests. Analyses performed may be in an order from fastest to slowest to maintain system responsiveness for other sign-in requests. For example, the TES 306 may first reference the short-term data store 316, then the TES 306 rules, and then the log database 312. The attributes of the fingerprint that the TES 306 identifies as suspicious may be sent to the risk score generator 320.

The risk score generator 320 may generate a risk score for the fingerprint based on the query of the short-term data store 316. For example, the risk score may be based on the number of attributes of the decrypted fingerprint that can be found in the short-term data store 316. In one or more embodiments, the risk score generator 320 may apply a predetermined set of rules for dynamically generating a risk score based on the fingerprint.

In one or more embodiments, if the decryption is unsuccessful, the risk score generator 320 may output a high risk score. For example, if the fingerprint is an arbitrary value, the decryption will not yield information meaningful to the system, which may indicate that the fingerprint is forged, and a maximum risk score may be generated.

Risk score generator 320 may send the risk score to the backend service 310 to determine a response to the sign-in request. To determine the response, the backend service 310 may compare the risk score to one or more risk score thresholds. The backend service 310 may receive one or more risk score thresholds, determined (e.g., periodically or dynamically) by the analyst 314, from the short-term data store 316 or log database 312. The one or more risk score thresholds may be used in determining the number and/or severity of challenge(s) to be issued. The challenge(s) that may be issued to the user 318 by the backend service 310 may relate to the risk score threshold(s) met by the risk score. For example, a risk score satisfying a first threshold may result in a CAPTCHA issued to the user 318; a risk score satisfying a second threshold may result in a temporary suspension of the user 318; a risk score satisfying a third threshold may result in a permanent suspension of an account of the user 318. The issued challenges may add friction to the sign-in process, which may thwart malicious users and reduce the speed at which bots may operate.

Figure 2:
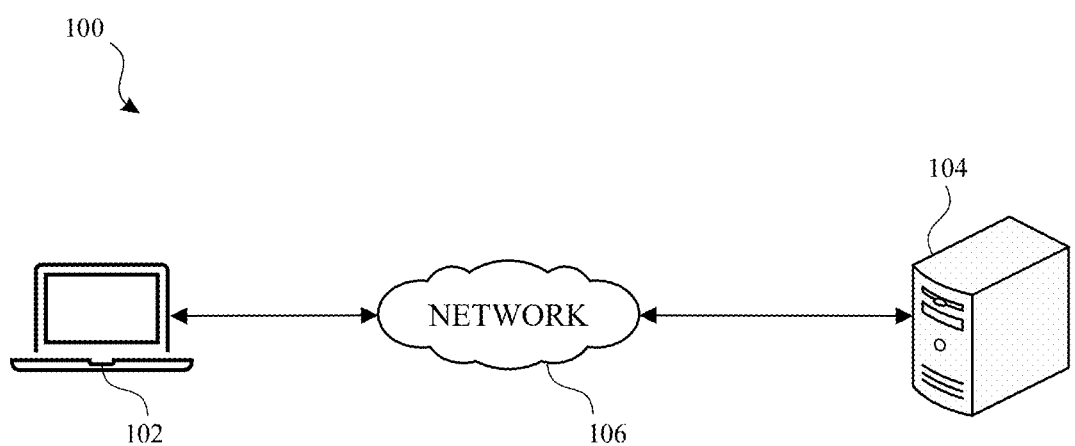
FIG. 2 illustrates an example network environment, in accordance with one or more embodiments of the subject technology.

FIG. 2 illustrates a network environment 100, in accordance with one or more embodiments. Not all of the depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

The network environment 100 generally includes a plurality of computing devices and services that are interconnected to exchange data and resources with each other. A network environment may include one or more computing devices, such as a computer 102 and a server 104. The network 106 may communicatively couple (directly or indirectly) the computer 102 and the server 104. In one or more embodiments, the network 106 may be an interconnected network of devices that may include, or may be communicatively coupled to, the Internet. For explanatory purposes, the network environment 100 is illustrated in FIG. 1 as including the computer 102 and the server 104; however, the network environment 100 may include any number of electronic devices and/or any number of servers communicatively coupled to each other directly or via the network 106.

The computer 102 may be, for example, a desktop computer, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, near field communication (NFC) radios, and/or other wireless radios. In FIG. 1, by way of example, the computer 102 is depicted as a laptop computer. The computer 102 may be, and/or may include all or part of, the electronic system discussed below with respect to FIG. 6.

The server 104 may be a device similar to the computer 102 and may be virtualized as described herein. Moreover, server 104 may comprise services and other computing features such as large scale storage or serverless processes supported by a cloud service. The server 104 may also include a threat evaluation service and one or more applications. In FIG. 1, by way of example, the server 104 is depicted as a server computer. The server 104 may be, and/or may include all or part of, the electronic system discussed with respect to FIG. 1. The server 104 may receive sign-in requests from the computer 102 for accessing an account. The server 104 may include an authentication service and/or a threat evaluation service for handling sign-in requests.

As noted, in some examples, a threat evaluation service may be implemented as a cloud computing service. Accordingly, a client device may make an application programming interface (API) call to such a service upon receiving a sign-in request (and/or a batch of sign-in requests). The API call may include at least attributes associated with a user's interaction during the sign-in process. The service may input the data (e.g., after concatenation or other preprocessing) into the threat evaluation service to determine the risk score of the sign-in request. The threat evaluation service may output a risk score of the sign-in request. A threshold risk score may be set by predetermined and/or may be set by an analyst that manually or automatically identifies threat vectors and assigns risk scores to sign-in requests and/or attributes derived therefrom. The output data may be utilized in the server 104 to determine a response to the sign-in request. The response may vary in degree and/or frequency based on the risk score of the sign-in request(s).

Advantageously, when a threat evaluation service is employed as a centralized service that is accessible via API calls over a cloud service, the service may be improved over time to detect and/or prevent bots from flooding an authentication server with malicious sign-in requests. The ability to detect different attack vectors (e.g., ranges of IP addresses, locations, and/or other sign-in related data) may inure to the benefit of millions of user accounts over potentially several entities availing themselves of the threat evaluation service as the service can build a database of attack vectors and identify patterns and shifts in patterns of attacks to anticipate and prevent future threats. For example, a first entity using the threat evaluation service may experience fraudulent or malicious sign-in requests from a first range of IP addresses. The threat evaluation service may generate a database of sign-in requests that may be used to e.g., update the weights of a machine learning model used to predict fraudulent attacks based on the first cluster of IP addresses. Thereafter, a second entity using the threat evaluation service may prevent fraudulent attacks from that first cluster of IP addresses even though the second entity may not have experienced fraudulent attacks from that cluster in the past.

In some examples, IP addresses and/or other identifiers associated with fraudulent sign-in requests may be blocked. For example, the IP addresses may be blocked for a specified period of time in order to avoid blocking legitimate service requests. For example, an IP address may be blocked by preventing and/or denying access by the IP address to the requested service. Similarly, in some examples, anomalous clusters may be defined for a particular period of time to avoid static definitions of adversarial networks.

In some examples, responses to fraudulent sign-in requests may be ordered in tiers to bottleneck the worst offenders while adding only slight friction to the sign-in process for suspected offenders. For example, IP addresses associated with repeated fraudulent sign-in requests (e.g., where bots generate hundreds of sign-in requests per minute) may receive a suspension from submitting further sign-in requests, while IP addresses associated with a single sign-in request that happens to match a previously identified fraudulent sign-in request (e.g., a user that submits an incorrect password multiple times) may receive a test for the user to solve before authorizing the sign-in.

Figure 3:
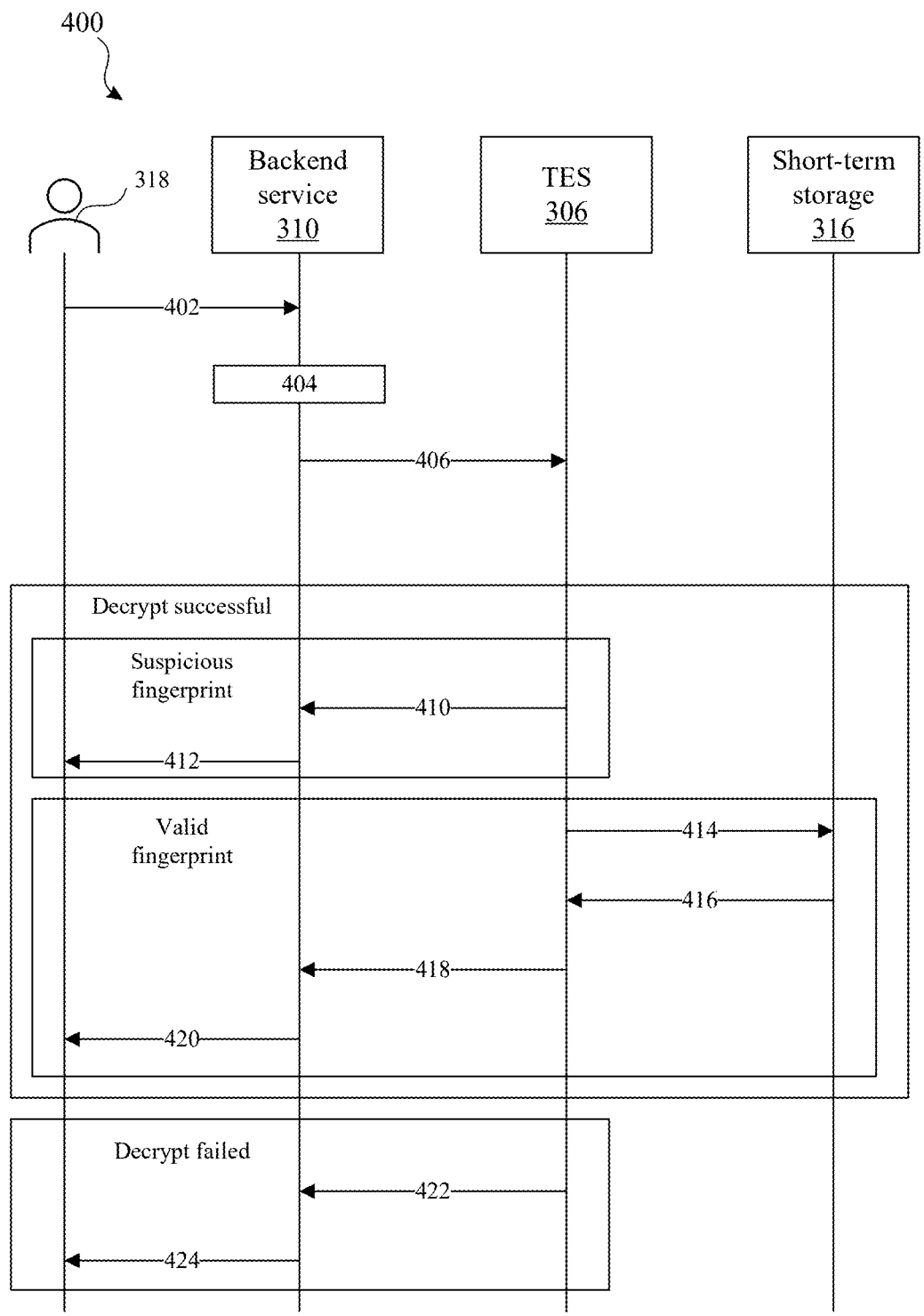
FIG. 3 illustrates a sequence diagram of the example threat evaluation process, in accordance with one or more embodiments of the subject technology.

FIG. 3 illustrates a sequence diagram of the threat evaluation scenario 400, in accordance with one or more embodiments of the subject technology. The scenario 400 may begin when a user 318 sends a sign-in request 402. The sign-in request 402 may be sent by the user 318 via a frontend interface or a non-frontend interface (e.g., command line interface, application programming interface, etc.) to a backend service 310.

The backend service 310 may extract information 404 from the sign-in request 402, including a fingerprint and metadata of the sign-in request 402. The fingerprint of the sign-in request 402 may be sent to the TES 306 for risk evaluation. The fingerprint may be an encrypted data structure including attributes such as a timestamp, user agent (e.g., browser information), user interaction (e.g., mouse clicks and key presses), time spent on a page, number of requests sent per time period, and other data relating to the sign-in request.

An ad hoc analysis 406, between the backend service 310 and the TES 306, may decrypt the fingerprint to extract the sign-in attributes from the fingerprint. The TES 306 may analyze the fingerprint to identify abnormalities in the fingerprint data, such as missing required attributes or attributes that indicate bot-like behavior. For example, if a timestamp is required by the backend service 310, an abnormality would include the fingerprint missing a timestamp. Bot-like behavior may be represented by actions that cannot, or are unlikely to, be performed by a human user. For example, a bot may send a sign-in request many thousands of times per minute, without clicking on a user interface, and/or without a browser (e.g., user agent).

If the decryption of the fingerprint at the ad hoc analysis 406 was successful, a risk score generator 410 may generate a risk score based on the degree of suspicion (e.g., number of abnormalities identified by the TES 306) and send the risk score to the backend service 310 for handling the sign-in request 402 (e.g., determining whether the sign-in request 402 should proceed with authentication). In some cases, the sign-in request may contain invalid fingerprints that include forged fingerprints generated arbitrarily by the actor and that therefore do not decrypt correctly as well as duplicated fingerprints, where the actor generates the fingerprint once in a legitimate browser and then reuses it across scripts to millions of calls. Both options are not possible in a legitimate context and are clear signals of fraudulent (or at least unsupported) activity. However, NULL fingerprints happen when the user agent does not generate any fingerprint at all. Therefore, the prevalence of these NULL fingerprints may be detected.

If the fingerprint can be decrypted and is not initially suspicious, the fingerprint may be valid. However, a valid fingerprint does not necessarily mean the sign-in request is not malicious. A short-term data store 316 (e.g., a cache having a set of attributes of sign-in requests) may include previously identified suspicious fingerprints (or attributes thereof). The TES 306 may query 414 the short-term data store 316 to determine whether the fingerprint (or attributes thereof) was previously identified as suspicious. The TES 306 may aggregate identified suspicious information associated with the fingerprint (e.g., suspicious attributes) to output to a risk score generator 418, which generates a risk score corresponding to the fingerprint based on the identified suspicious information. The risk score may be based on the results 416 of the query 414. For example, if all attributes of the fingerprint are found in the short-term data store 316, the fingerprint may be assigned a level of 1, indicating a high risk score. The risk score generator 418 may generate a risk score based on the degree of suspicion (e.g., number of abnormalities) and send the risk score to the backend service 310 for handling the sign-in request 402.

If the decrypt fails, the fingerprint may be treated as being associated with a malicious user. A decrypt may fail, for instance, if the fingerprint is merely a random string, is missing, cannot be decrypted, or does not include required fields. If the fingerprint cannot be decrypted, the risk score generator 422 may generate a high risk score (e.g., a maximum risk score) and send the risk score to the backend service 310. In one or more embodiments, the risk score generators 410, 418, 422 may be the same risk score generator.

After receiving a risk score from any of risk score generators 410, 418, 422, the backend service 310 may reject or approve the sign-in request for further use. In a scenario in which the decrypt of the fingerprint fails, the response 424 may automatically be a rejection of the sign-in request 402. If the risk scores indicate that the fingerprint is suspicious (e.g., the risk score is at or above a risk score threshold), then the responses 412, 420 may be a rejection of the sign-in request 402. If the risk scores indicate that the fingerprint is not suspicious (e.g., the risk score is below a risk score threshold), then the response 420 may be an indication that the sign-in request 402 passes the threat evaluation, and the sign-in request 402 may proceed with the sign-in process (e.g., authentication).

Figure 4:
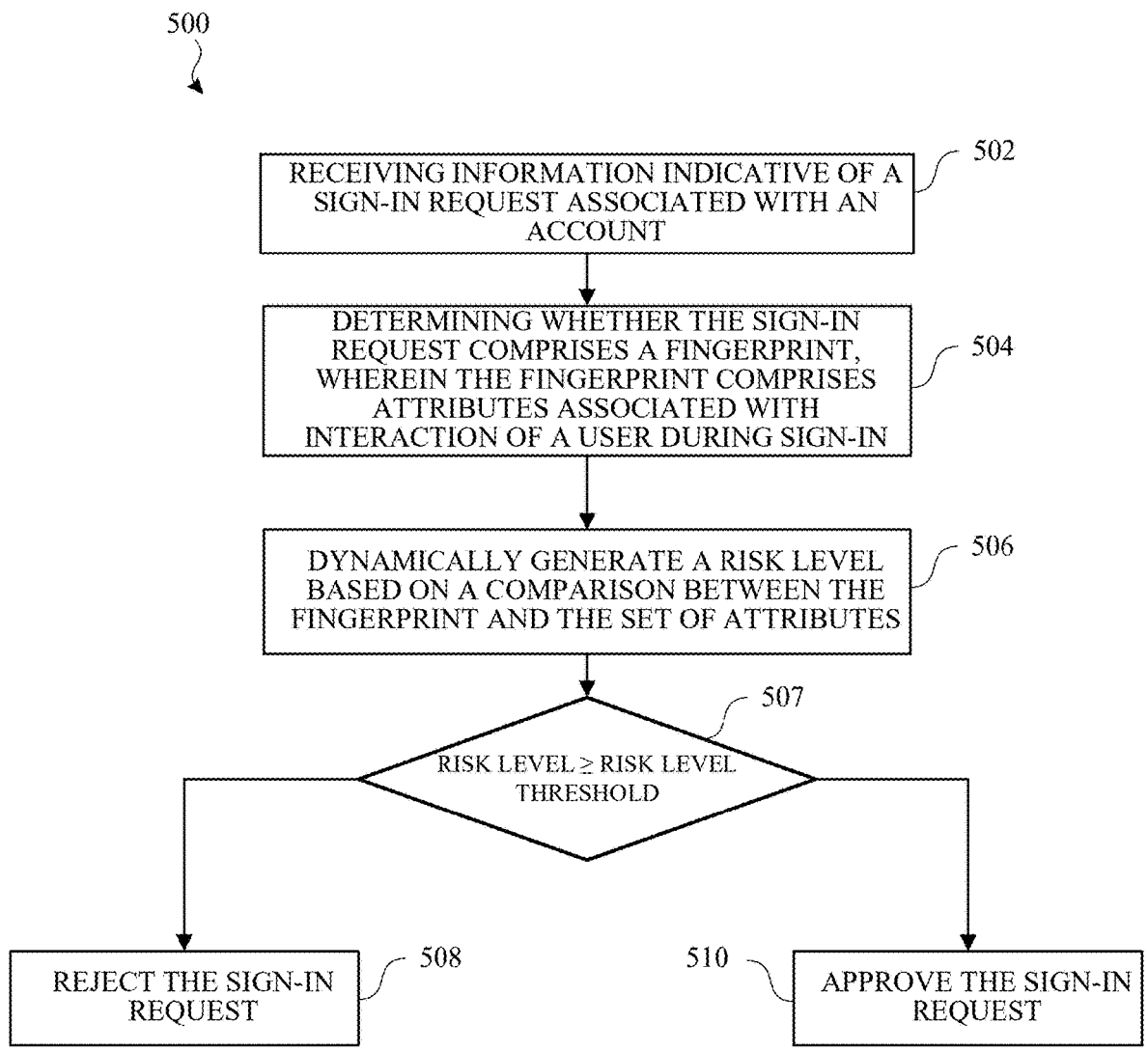
FIG. 4 illustrates a flow diagram of an exemplary process for threat evaluation, in accordance with one or more embodiments of the subject technology.

FIG. 4 illustrates a flow diagram of a process 500 for risk evaluation, in accordance with one or more embodiments of the subject technology. For explanatory purposes, the process 500 is primarily described herein with reference to FIG. 2 and FIG. 3. However, the process 500 is not limited to the items shown in FIG. 2 and FIG. 3, and one or more blocks (or operations) of the process 500 may be performed by one or more other components of other suitable devices. Further, for explanatory purposes, the blocks of the process 500 are described herein as occurring serially or linearly. However, multiple blocks of the process 500 may occur in parallel. In addition, the blocks of the process 500 need not be performed in the order shown and/or one or more blocks of the process 500 need not be performed and/or may be replaced by other operations.

In the process 500, at block 502, a system (e.g., the server 104) may receive information indicative of a sign-in request from a user (e.g., user 318). The information may include a message, packet, transmission, and the like. The sign-in request may include credentials (e.g., a username and password), which may be associated with an account registered with the system.

At block 504, the TES may determine whether the sign-in request includes a fingerprint. In addition to credentials, the sign-in request may also include a fingerprint. The fingerprint may be encrypted information that is generated by the requester (e.g., the user) and sent to the backend service (e.g., backend service 310). The fingerprint may be generated at a frontend and may include device-based properties such as an IP address of the requester, a sign-in time (e.g., timestamp of the generation of the fingerprint), a user agent (e.g., a web browser), key presses (e.g., used in typing the user credentials), mouse clicks (e.g., used to click the sign-in button on a web page), time-on-page (e.g., a duration of time a user spent on a web page before sending the sign-in request), and any other metadata of the requester that can be used to uniquely identify a particular sign-in session.

At block 506, the TES may generate a risk score based on a comparison of one or more attributes of the fingerprint with one or more attributes in a set of attributes (e.g., in a short-term data store 316). The backend service may send the fingerprint to a TES to determine whether the fingerprint and the associate sign-in request are likely malicious. To determine whether the sign-in request is likely malicious, the fingerprint may be analyzed to determine whether it is arbitrarily generated, is a duplicate, contains suspicious information, or is missing; however, the subject technology is not limited to such characteristics.

If the fingerprint can be decrypted and the TES can access the fingerprint's information, the TES may search the set of attributes for those previously flagged as indicative of malicious behavior and flag attributes of the fingerprint found in the cache. For example, attributes stored in the cache may include an IP address range and a number of invalid credentials used by the IP address range over a period of time. If the fingerprint at issue has an IP address in the same IP address range and includes invalid credentials, then the sign-in request associated with the fingerprint may be considered likely malicious, and one or more attributes of the fingerprint may be flagged.

The risk score may be based on a number of flagged attributes of the fingerprint. The risk score may also or instead be based on a type of flagged attributes of the fingerprint. A type of attribute may be more likely to be utilized maliciously than other attributes. For example, an analyst (e.g., analyst 314) may determine that particular attributes may have a higher risk score than other attributes based on their frequency of use in threat patterns identified by the analyst.

The TES may perform additional fingerprint analyses to generate a risk score. The system may analyze the time spent on the sign-in page before sending the sign-in request. For example, a user spending an abnormally low time on a sign-in page (e.g., 100 milliseconds time-on-page), as indicated by the fingerprint, may be an indication that the user is a bot scripting a sign-in process.

The TES may also or instead analyze user interactions such as mouse clicks. Since the sign-in page looks identical to users, it may be expected that the mouse click positions for signing in be similar between users. For example, mouse click positions of the user in a sign-in process beyond a threshold level from particular areas of a sign-in page (e.g., username and password fields and submit button) and/or at a beginning or end pixel position (e.g., (0, 0) or (max, max) in an (x, y) plane), as indicated by the fingerprint, may be an indication that the user is a bot scripting a sign-in process.

The TES may also or instead analyze the timestamp of the fingerprint. For example, if the difference between timestamps of the sign-in request from an IP address and a previous sign-in request from the same IP address is below a threshold amount, the fingerprint may be flagged as an indication that the user is a bot scripting a sign-in process because the input is faster than is typical of a human.

In one or more embodiments, a risk score may be generated for invalid or duplicate fingerprints. A fingerprint may be invalid if the fingerprint cannot be decrypted, does not decrypt to any meaningful metadata, or is missing from the sign-in request. For example, if the fingerprint is a random string, then the fingerprint may decrypt to information that the system does not understand. Invalid fingerprints may receive a maximum risk score such that the sign-in request may require solving all challenges or may be rejected if the fingerprint is invalid. A fingerprint would be a duplicate if it was previously used in a successful sign-in attempt. Malicious users (e.g., bots) may attempt to reuse fingerprints to trick the system and make many (e.g., millions) of sign-in requests. For example, a malicious user may intercept the traffic of a legitimate sign-in request and extract the fingerprint. The malicious user may then attempt to use the fingerprint with a set of credentials to trick the TES into indicating that the sign-in request is not malicious.

At block 507, the system (e.g., the backend service 310) may compare the risk score with one or more risk score thresholds. After the TES determines the risk score, the TES may send the risk score to the backend service. The backend service may receive one or more risk score thresholds from the cache (e.g., short-term data store 316) or log database (e.g., log database 312). Heuristics may be used to determine one or more thresholds such that risks can be split among one or more levels associated with one or more available options (e.g., challenges or blocks) with which to respond to the request. The number of challenges there are and/or blocks that can be done may determine the number of risk levels such that each risk level increase will add more challenges to each request.

The one or more risk score thresholds may be used in determining whether to reject or approve the sign-in request. If the risk score is at or above the risk score threshold, the process 500 may proceed to block 508; otherwise, the process 500 may proceed to block 510.

In one or more embodiments, one or more risk score thresholds may be based on one or more log entries stored in the log database. One or more risk score thresholds may be determined (e.g., generated or recalibrated) manually and/or automatically by an analyst (e.g., analyst 314). An analyst may be one or more individuals and/or machine learning models that evaluate the one or more log entries to determine patterns of malicious activity, rates of rejections issued, types of rejections issued, and other aggregated metrics.

At block 508, the system may reject the sign-in request in response to the risk score being at or above one or more risk score thresholds. Rejecting the sign-in request may include issuing a challenge, suspension, ban, or any other consequence on an account, IP address, or any other identifier associated with the sign-in request. A challenge may be any action or process that adds friction (e.g., reduces ease of use) to the sign-in process, which may thwart malicious users and reduce the speed at which bots may operate. For example, a challenge may include a CAPTCHA, proof-of-work, and/or throttling the user's requests for a period of time. A suspension may be a rejection of an account, IP address, or any other identifier associated with the sign-in request for a period of time. A rejection may include a ban, which ban may be a permanent rejection of an account, IP address, or any other identifier associated with the sign-in request.

The severity (e.g., amount of friction, duration of suspension, etc.) of the rejection may be based on the one or more thresholds met or exceeded by the risk score and/or the degree to which the one or more thresholds were exceeded. For example, a risk score satisfying a first threshold may result in a CAPTCHA issued to the user; a risk score satisfying a second threshold may result in a temporary suspension of the user; a risk score satisfying a third threshold may result in a permanent suspension of an account of the user.

At block 510, the system may approve the sign-in request. Upon approval, the sign-in request may proceed with the sign-in process. For example, the credentials associated with the sign-in request may be authenticated. If the authentication is successful, the user may sign-in to the account associated with the credentials.

In one or more embodiments, one or more attributes of the fingerprint and/or corresponding sign-in request may be saved to a log database (e.g., log database 312). The log database may include a log of entries that include attributes from previous fingerprints and/or sign-in requests. A new log entry may be derived from the present fingerprint and/or corresponding sign-in request and may be added to the log. For example, the log entry may include credentials, timestamp, IP address, location, user behavior (e.g., mouse clicks and key presses), and any other data that may be associated with the fingerprint and/or corresponding sign-in request. The new log entry may also include the risk score determined in block 506.

In one or more embodiments, one or more log entries from the log database may be transferred to the cache for reference by the TES in subsequent fingerprint evaluations. The one or more log entries may be transferred with all or some of the corresponding attributes. For example, the log entries transferred may only include a timestamp, an IP address, and a risk score.

Figure 5:
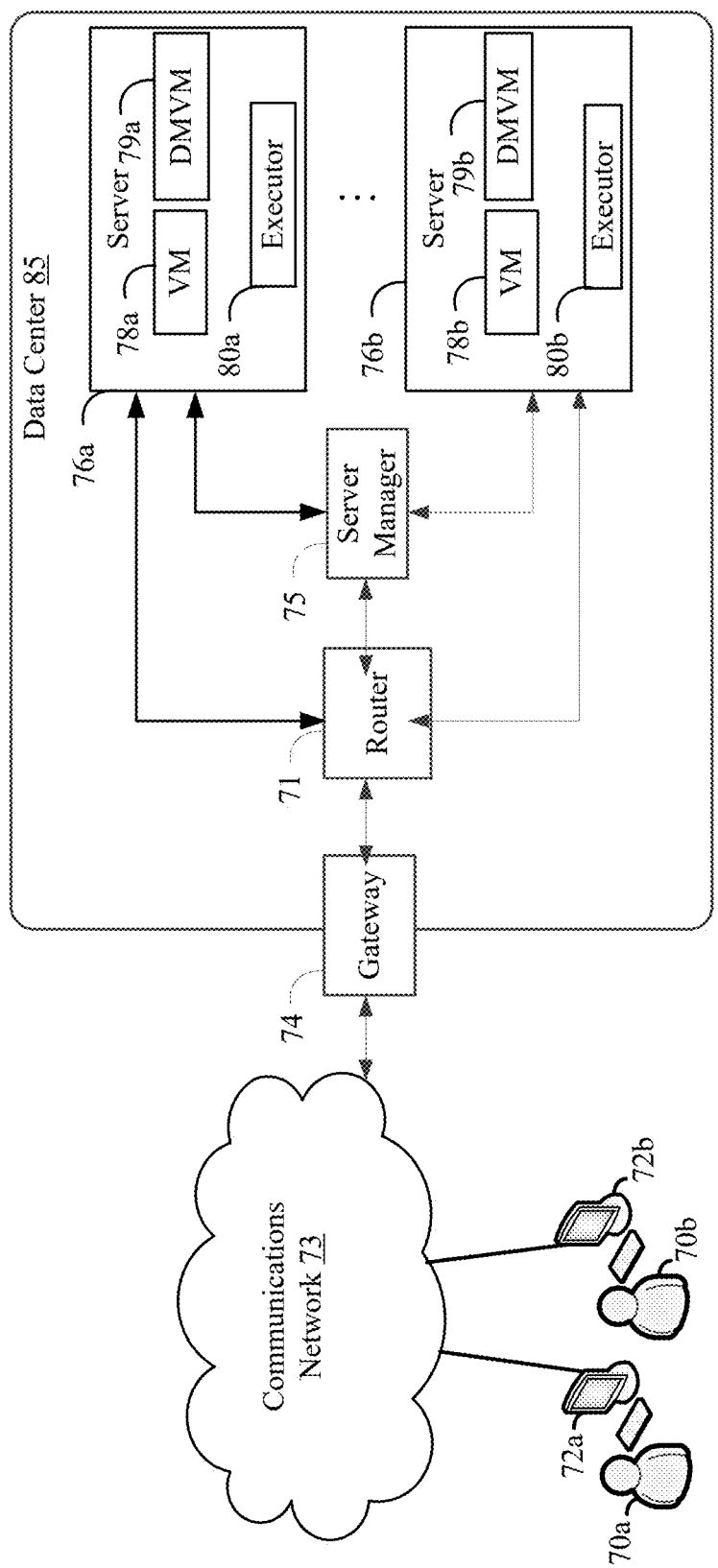
FIG. 5 illustrates an example system in which aspects of the disclosed threat evaluation system may be used in accordance with the present disclosure.

An example system in which the network environment 100 of FIG. 1 and in which the bot detection service and/or the threat evaluation service may operate will now be described in detail. In particular, FIG. 5 illustrates an example computing environment in which the embodiments described herein may be implemented. FIG. 5 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). In this example, the resources also include distribution and modification virtual machines (DMVM's) 79a-b, which are virtual machines that are configured to execute any, or all, of the dynamic messaging group distribution and modification techniques described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 5, the network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 5 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of embodiments can be utilized with the concepts and technologies disclosed herein. For example, the embodiments disclosed herein might also be utilized with computing systems that do not utilize virtual machine instances.

In the example data center 85 shown in FIG. 5, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 5, a server manager 75 is also employed to at least in part direct various communications to, from and/or between servers 76a and 76b. While FIG. 5 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location, or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 5 has been greatly simplified and that many more networks and networking devices may be utilized to interconnect the various computing systems disclosed herein. These network topologies and devices should be apparent to those skilled in the art.

It should also be appreciated that data center 85 described in FIG. 5 is merely illustrative and that other embodiments might be utilized. It should also be appreciated that a server, gateway, or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order or partitioned differently) without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged or that all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Figure 6:
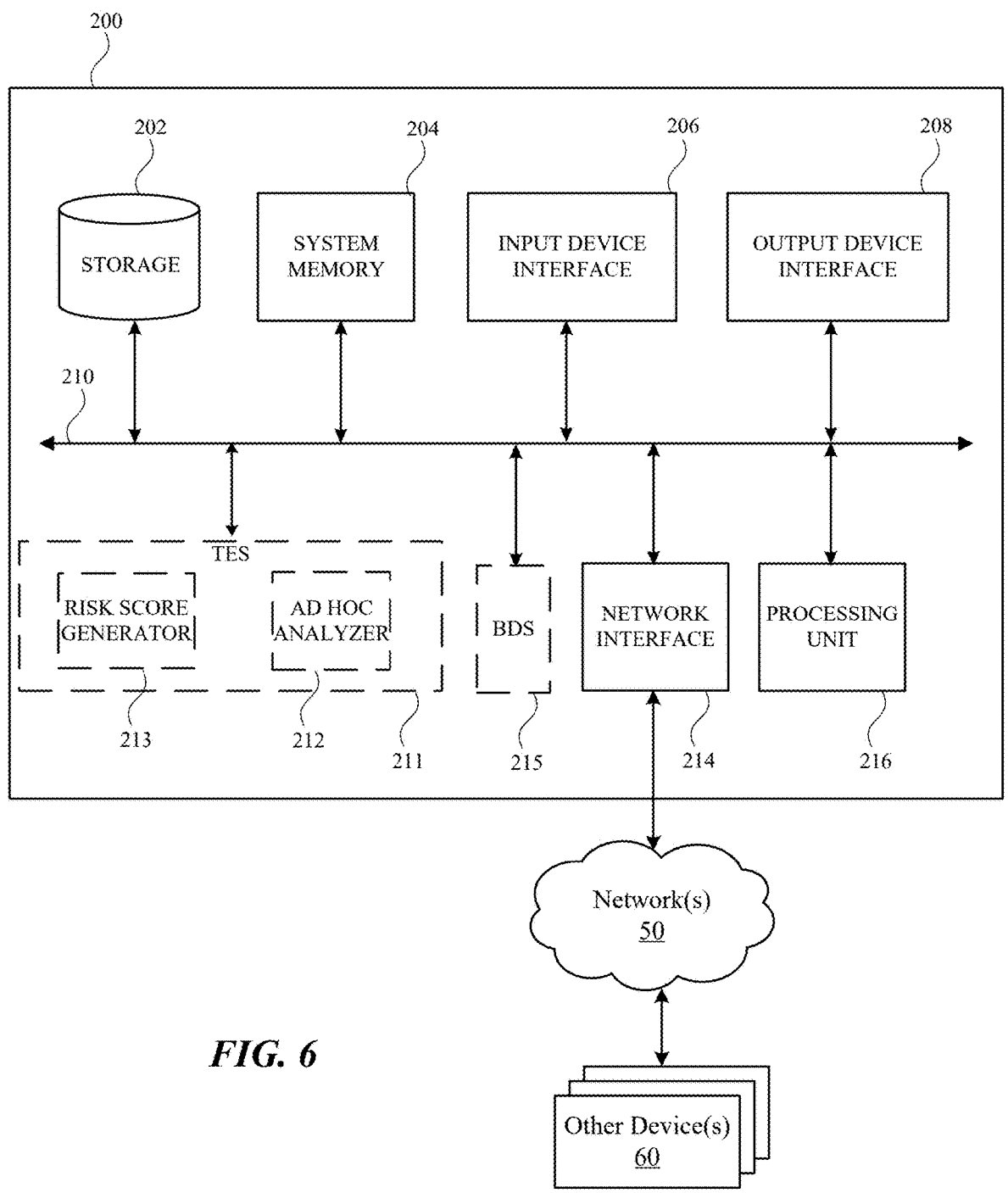
FIG. 6 illustrates an example electronic system, in accordance with one or more embodiments of the subject technology.

FIG. 6 illustrates an example electronic system 200, in accordance with one or more embodiments of the subject technology. The electronic system 200 may be, and/or may be a part of, a computing device (e.g., computer 102 and server 104). The electronic system 200 may include various types of computer-readable media and interfaces for various other types of computer-readable media. The electronic system 200 includes a bus 210, a storage device 202, a system memory 204, an input device interface 206, an output device interface 208, a TES 211, an ad hoc analyzer 212, a risk score generator 213, a bot detection service 215, a network interface 214, and a processing unit 216, or subsets and variations thereof. Not all depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

Network interface 214 may be configured to allow data to be exchanged between the electronic system 200 and devices 60 attached to a network or networks 50, such as other computer systems or devices. In various embodiments, network interface 214 may support communication via any suitable wired or wireless general data networks, such as types of Ethernet networks, for example. Additionally, network interface 240 may support communication via telecommunications/telephony networks, such as analog voice networks or digital fiber communications networks, via storage area networks such as Fiber Channel SANs (storage area networks) or via any other suitable type of network and/or protocol.

The bus 210 collectively represents all system, peripheral, and chipset buses that communicatively connect the numerous internal devices of the electronic system 200. In one or more embodiments, the bus 210 communicatively connects the processing unit 216 with the other components of the electronic system 200. From various memory units, the processing unit 216 retrieves instructions to execute and data to process in order to execute the operations of the subject disclosure. The processing unit 216 may be a controller and/or a single- or multi-core processor or processors in various embodiments.

The storage device 202 may be a read-and-write memory device. The storage device 202 may be a non-volatile memory unit that stores instructions and data (e.g., static and dynamic instructions and data) even when the electronic system 200 is off. Data may include one or more long-term data stores (e.g., databases). In one or more embodiments, a mass-storage device (such as a magnetic or optical disk and its corresponding disk drive) may be used as the storage device 202. In one or more embodiments, a removable storage device (such as a flash drive, and its corresponding disk drive) may be used as the storage device 202. Generally speaking, a computer-accessible medium may include non-transitory storage media or memory media, such as magnetic or optical media. A non-transitory computer-accessible storage medium may also include any volatile or non-volatile media, such as RAM (e.g., SDRAM, DDR SDRAM, RDRAM, SRAM, etc.), ROM (read-only memory) etc., that may be included in some embodiments of computing device 15 as system memory 204 or another type of memory.

Like the storage device 202, the system memory 204 may be a read-and-write memory device. However, unlike the storage device 202, the system memory 204 may be a volatile read-and-write memory, such as random-access memory. The system memory 204 may store any of the instructions and data that one or more processing unit 216 may need at runtime to perform operations. Data may include one or more short-term data stores (e.g., caches and buffers). In one or more embodiments, the processes of the subject disclosure are stored in the system memory 204 and/or the storage device 202. From these various memory units, the one or more processing unit 216 retrieves instructions to execute and data to process in order to execute the processes of one or more embodiments, discussed below.

Embodiments within the scope of the present disclosure may be partially or entirely realized using a tangible computer-readable storage medium (or multiple tangible computer-readable storage media of one or more types) encoding one or more instructions. The tangible computer-readable storage medium also may be non-transitory in nature.

The computer-readable storage medium may be any storage medium that may be read, written, or otherwise accessed by a general-purpose or special-purpose computing device, including any processing electronics and/or processing circuitry capable of executing instructions. For example, without limitation, the computer-readable medium may include any transitory semiconductor memory (e.g., the system memory 204), such as RAM, DRAM, SRAM, T-RAM, Z-RAM, and TTRAM. The computer-readable medium also may include any non-transitory semiconductor memory (e.g., the storage device 202), such as ROM, SSD, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium may include any non-semiconductor memory, such as optical disk storage, magnetic disk storage, magnetic tape, other magnetic storage devices, or any other medium capable of storing one or more instructions. In one or more embodiments, the tangible computer-readable storage medium may be directly coupled to a computing device, while in other embodiments, the tangible computer-readable storage medium may be indirectly coupled to a computing device, e.g., via one or more wired connections, one or more wireless connections, or any combination thereof.

Instructions may be directly executable or may be used to develop executable instructions. For example, instructions may be realized as executable or non-executable machine code or as instructions in a high-level language that may be compiled to produce executable or non-executable machine code. Further, instructions also may be realized as or may include data. Computer-executable instructions also may be organized in any format, including routines, subroutines, programs, data structures, objects, modules, applications, applets, functions, etc. As recognized by those of skill in the art, details including, but not limited to, the number, structure, sequence, and organization of instructions may vary significantly without varying the underlying logic, function, processing, and output.

While the above discussion primarily refers to microprocessors or multi-core processors that execute software, one or more embodiments are performed by one or more integrated circuits, such as ASICs or FPGAs. In one or more embodiments, such integrated circuits execute instructions that are stored on the circuit itself.

The bus 210 also connects to the input device interface 206 and output device interface 208. The input device interface 206 enables the system to receive inputs. For example, the input device interface 206 allows a user to communicate information and select commands on the electronic system 200. The input device interface 206 may be used with input devices such as keyboards, mice, dials, switches, sliders, and other interfaces (physical or virtual) for a user to supply information to the electronic system 200. The output device interface 208 may be used with output devices such as displays, speakers, and other interfaces (physical or virtual) for the computing electronic system 200 to provide information. One or more embodiments may include devices that function as both input and output devices, such as a touchscreen.

The ad hoc analyzer 212 may include hardware and/or software for performing an ad hoc analysis on a sign-in request. The ad hoc analysis may include identifying a fingerprint of a sign-in request and/or decrypting and extracting information from a fingerprint of a sign-in request. The ad hoc analyzer 212 may receive as input a sign-in request or components thereof (e.g., a fingerprint of a sign-in request). The ad hoc analyzer 212 may extract fingerprint from a sign-in request, decrypt a fingerprint, and/or extract information from a fingerprint. The sign-in request may be any data structure that includes information relating to accessing a user account (e.g., credentials), and a fingerprint may be any data structure that includes metadata relating to accessing the user account (e.g., timestamp, time-on-page, mouse clicks) The ad hoc analyzer 212 is shown in dashed lines to indicate that ad hoc analyzer 212 may or may not reside in the same systems as TES 211.

The TES 211 may include hardware and/or software for identifying bot-like behavior in sign-in requests. Identifying bot-like behavior may include identifying one or more instances of bot-like behavior in sign-in requests (e.g., fingerprint) based on suspicious or malicious sign-in requests flagged in storage 202 (e.g., a short/long-term data store). Identifying bot-like behavior may also include comparisons to patterns of previously identified bot-like behavior, heuristics, and the like.

The bot detection service 215 may include hardware and/or software for identifying broad patterns of bot-like behavior based on a plurality of sign-in requests that include attributes of fraudulent sign-in requests. Patterns of bot-like behavior may be used to set risk score thresholds for determining when and/or how to handle potential malicious sign-in requests. Identifying bot-like behavior may be realized by one or more machine learning models, trained on analyses of a plurality of sign-in requests known to be likely malicious or safe, to output a likelihood of risk.

Machine learning techniques, such as those described herein, are often used to form predictions, solve problems, recognize objects in image data for classification, etc. For example, herein machine learning techniques may be used to predict whether or not incoming one or more sign-in requests are likely to be fraudulent. In various examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as neural networks, are often used to detect patterns in data and/or perform tasks.

Generally, in machine learning models, such as neural networks, parameters control activations in neurons (or nodes) within layers of the machine learned models. The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation.

Generally, in machine learning models, such as neural networks, after initialization, annotated training data may be used to generate a cost or "loss" function that describes the difference between the expected output of the machine learning model and the actual output. The parameters (e.g., weights and/or biases) of the machine learning model may be updated to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as backpropagation.

The risk score generator 213 may include hardware and/or software for generating a risk score based on information contained in (e.g., a fingerprint) and/or relating to (e.g., attributes found in a cache) sign-in request. The risk score generator 213 may receive a set of information from or relating to a fingerprint, including information that the TES 211 has identified as suspicious. With the received information, the risk score generator 213 may generate and output a risk score indicating a level of risk associated with a fingerprint of a sign-in request. The risk score generator 213 is shown in dashed lines to indicate that risk score generator 213 may or may not reside in the same systems as TES 211.

The bus 210 also couples the electronic system 200 to one or more networks and/or to one or more network nodes through the network interface 214. The network interface 214 may include one or more interfaces that allow the electronic system 200 to be a part of a network of computers (e.g., a local area network (LAN), a wide area network (WAN), or a network of networks (the Internet)). For example, the network interface 214 may include a network interface card (NIC).

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some embodiments; in other embodiments, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some embodiments inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

The predicate words "configured to," "operable to," and "programmed to" do not imply any particular tangible or intangible modification of a subject but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some embodiments, one or more embodiments, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations or one or more configurations. A disclosure relating to such phrase(s) may provide one or more examples. A phrase such as an aspect or some aspects may refer to one or more aspects and vice versa, which applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public, regardless of whether such disclosure is explicitly recited in the claims.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Headings and subheadings, if any, are used for convenience only and do not limit the subject disclosure.

What is claimed is:
1. A method, comprising:
receiving information indicative of a sign-in request associated with an account registered on a service;

determining whether the sign-in request comprises a fingerprint, wherein the fingerprint comprises one or more attributes associated with an interaction of a user with the service in conjunction with providing credentials during a sign-in attempt on the account;

dynamically generating a risk score based on a comparison of the one or more attributes of the fingerprint with one or more attributes of a set of attributes collected from a plurality of sign-in requests, wherein the set of attributes collected from the plurality of sign-in request are transferred from one or more log entries having a time-to-live value and wherein the risk score is based on a determination that the fingerprint correlates with attributes in a set of attributes identified as associated with behavior associated with a bot; and in response to the risk score being at or above a risk score threshold, issuing an indication of failure of the sign-in request.

2. The method of claim 1, wherein the set of attributes is stored in a short-term data store.

3. The method of claim 1, wherein the dynamically generating step is in response to determining that the sign-in request comprises a fingerprint.

4. The method of claim 1, wherein the fingerprint comprises one or more of a user credential, an IP address, a sign-in time, a user agent, a key press, a mouse click, or a time-on-page.

5. The method of claim 1, wherein the dynamically generating step comprises:
generating the risk score based on a number of matched attributes between the fingerprint and the set of attributes from the comparison.

6. The method of claim 1, wherein the dynamically generating step comprises:
generating the risk score based on a type of matched attributes between the fingerprint and the set of attributes from the comparison.

7. The method of claim 1, further comprising:
saving, in a log database, at least one log entry comprising one or more attributes of the one or more of the sign-in request and the fingerprint.

8. The method of claim 7, wherein:
the risk score threshold is based on log entries stored in the log database.

9. The method of claim 7, further comprising:
assigning the time-to-live value to the one or more transferred log entries.

10. The method of claim 1, wherein:
the indication of failure of the sign-in request comprises one or more of issuing a challenge, a suspension, or a ban.

11. A system, comprising:
a controller comprising a processor and a non-transitory memory device configured to perform operations comprising:
receiving information indicative of a sign-in request associated with an account associated with a service;
determining whether the sign-in request comprises a fingerprint, wherein the fingerprint comprises one or more attributes associated with an interaction of a user with the service in conjunction with providing credentials during a sign-in attempt;
generating a risk score based on a comparison of the one or more attributes of the fingerprint with one or more attributes of a set of attributes collected from a plurality of sign-in requests, wherein the set of attributes collected from the plurality of sign-in request are transferred from log entries having a time-to-live value and wherein the set of attributes comprises attributes identified as associated with malicious behavior; and
in response to the risk score being at or above a risk score threshold, issuing an indication of failure of the sign-in request.

12. The system of claim 11, wherein the set of attributes is stored in a short-term data store.

13. The system of claim 11, wherein the dynamically generating step is in response to determining that the sign-in request comprises a fingerprint.

14. The system of claim 11, wherein the fingerprint comprises one or more of a user credential, an IP address, a sign-in time, a user agent, a key press, a mouse click, or a time-on-page.

15. The system of claim 11, wherein the dynamically generating step comprises:
generating the risk score based on a number of matched attributes between the fingerprint and the set of attributes from the comparison.

16. The system of claim 11, wherein the dynamically generating step comprises:
generating the risk score based on a type of matched attributes between the fingerprint and the set of attributes from the comparison.

17. The system of claim 11, wherein the controller is configured to perform operations further comprising:
saving, in a log database, at least one log entry comprising one or more attributes of the one or more of the sign-in request and the fingerprint.

18. The system of claim 17, wherein:
the risk score threshold is based on log entries stored in the log database.

19. The system of claim 17, wherein the controller is configured to perform operations further comprising:
assigning the time-to-live value to the one or more transferred log entries.

20. A non-transitory computer-readable medium, comprising:
one or more instructions that, when executed by one or more processors, cause the one or more processors to perform operations comprising:
receiving information indicative of a sign-in request associated with an account associated with a service;
determining whether the sign-in request comprises a fingerprint, wherein the fingerprint comprises one or more attributes associated with an interaction of a user with the service in conjunction with providing credentials during a sign-in attempt;
in response to determining that the sign-in request comprises a fingerprint, dynamically generating a risk score based on a comparison of the one or more attributes of the fingerprint with one or more attributes of a set of attributes collected from a plurality of sign-in requests, wherein the set of attributes collected from the plurality of sign-in request are transferred from log entries having a time-to-live value and wherein the set of attributes comprises attributes identified as associated with malicious behavior; and
in response to the risk score being at or above a risk score threshold, issuing an indication of failure of the sign-in request.

* * * * *